(12) United States Patent
Astaix et al.

(10) Patent No.: US 11,021,017 B2
(45) Date of Patent: Jun. 1, 2021

(54) RADIAL TIRE HAVING AN IMPROVED BELT STRUCTURE

(71) Applicant: COMPAGNIE GENERALE DES ETABLISSEMENTS MICHELIN, Clermont-Ferrand (FR)

(72) Inventors: Camille Astaix, Clermont-Ferrand (FR); Aurore Lardjane, Clermont-Ferrand (FR)

(73) Assignee: COMPAGNIE GENERALE DES ETABLISSEMENTS MICHELIN, Clermont Ferrand (FR)

( * ) Notice: Subject to any disclaimer, the term of this patent is extended or adjusted under 35 U.S.C. 154(b) by 215 days.

(21) Appl. No.: 16/083,578

(22) PCT Filed: Feb. 17, 2017

(86) PCT No.: PCT/FR2017/050365
§ 371 (c)(1),
(2) Date: Sep. 10, 2018

(87) PCT Pub. No.: WO2017/153654
PCT Pub. Date: Sep. 14, 2017

(65) Prior Publication Data
US 2020/0298623 A1     Sep. 24, 2020

(30) Foreign Application Priority Data
Mar. 11, 2016 (FR) ...................... 1652060

(51) Int. Cl.
*B60C 9/00* (2006.01)
*B60C 9/20* (2006.01)
*B60C 9/22* (2006.01)

(52) U.S. Cl.
CPC .......... *B60C 9/0064* (2013.01); *B60C 9/0042* (2013.01); *B60C 9/2003* (2013.01);
(Continued)

(58) Field of Classification Search
CPC .......... B60C 9/18; B60C 9/20; B60C 9/2009; B60C 9/22; B60C 2009/2061;
(Continued)

(56) References Cited

U.S. PATENT DOCUMENTS 4,371,025 A    2/1983   Canevari et al.
4,819,705 A    4/1989   Caretta
(Continued)

FOREIGN PATENT DOCUMENTS

EP    0738615 A2   10/1996
EP    0795426 A1    9/1997
(Continued)

OTHER PUBLICATIONS

Machine translation of JP 4-66305, 1992.*
International Search Report dated May 11, 2017, in corresponding PCT/FR2017/050365 (6 pages).

*Primary Examiner* — Justin R Fischer
(74) *Attorney, Agent, or Firm* — Venable LLP

(57) ABSTRACT

A radial tire comprises a multilayer composite laminate (10) comprising at least three superposed layers of reinforcers (110, 120, 130), the reinforcers being unidirectional within each layer and embedded in a thickness of rubber (C1, C2, C3, respectively), with a first layer of rubber (C1) comprising at least one row of heat-shrinkable circumferential textile reinforcers (110), for example made of nylon or polyester. The first layer radially (in the direction Z) surmounts two other layers (C2, C3) comprising metal reinforcers (120, 130) which are crossed from one layer to the next, in the form of steel monofilaments of a diameter between 0.20 mm and 0.50 mm. The reinforcers (110) made of heat-shrinkable textile material are tapes of thickness denoted "T" between 0.1 mm and 1 mm, and of thickness denoted "W" between 2 and 50 mm.

13 Claims, 3 Drawing Sheets

(52) U.S. Cl.
CPC ........ B60C 9/22 (2013.01); *B60C 2009/2077* (2013.01); *B60C 2009/2083* (2013.01); *B60C 2009/2247* (2013.01); *B60C 2009/2257* (2013.01); *B60C 2009/2266* (2013.01)

(58) Field of Classification Search
CPC .... B60C 2009/2074; B60C 2009/2077; B60C 2009/2238; B60C 2009/2252; B60C 2009/2257

See application file for complete search history.

(56) References Cited

U.S. PATENT DOCUMENTS

| | | |
|---|---|---|
| 5,858,137 A | 1/1999 | Assaad et al. |
| 8,960,252 B2 | 2/2015 | Deal |
| 9,186,871 B2 | 11/2015 | Le Clerc |
| 9,751,364 B2 | 9/2017 | Huyghe et al. |
| 9,902,204 B2 | 2/2018 | Lardjane et al. |
| 9,919,563 B2 | 3/2018 | Lardjane et al. |
| 2002/0011296 A1 | 1/2002 | Miyazaki et al. |
| 2002/0055583 A1 | 5/2002 | Iizuka et al. |
| 2012/0090755 A1 | 4/2012 | Deal |
| 2012/0090756 A1 | 4/2012 | Le Clerc |
| 2013/0206309 A1 | 8/2013 | Deal |
| 2013/0240104 A1 | 9/2013 | Le Clerc |
| 2014/0216625 A1 | 8/2014 | Peschek et al. |
| 2014/0216626 A1 | 8/2014 | Peschek et al. |
| 2014/0235124 A1 | 8/2014 | Doisneau et al. |
| 2014/0235125 A1 | 8/2014 | Doisneau et al. |
| 2014/0308864 A1 | 10/2014 | Doisneau et al. |
| 2015/0007922 A1 | 1/2015 | Lardjane et al. |
| 2015/0013873 A1 | 1/2015 | Lardjane et al. |
| 2015/0136298 A1 | 5/2015 | Huyghe et al. |
| 2016/0159155 A1 | 6/2016 | Astaix et al. |
| 2016/0193879 A1 | 7/2016 | Astaix et al. |
| 2016/0251550 A1 | 9/2016 | Michoud et al. |
| 2017/0050468 A1 | 2/2017 | Delfino |
| 2018/0022157 A1 | 1/2018 | Lardjane et al. |
| 2018/0022158 A1 | 1/2018 | Lardjane et al. |
| 2018/0022159 A1 | 1/2018 | Astaix et al. |
| 2018/0022160 A1 | 1/2018 | Astaix et al. |

FOREIGN PATENT DOCUMENTS

| | | |
|---|---|---|
| EP | 1162086 A2 | 12/2001 |
| EP | 1184203 A2 | 3/2002 |
| EP | 2781369 A1 | 9/2014 |
| EP | 2957436 A1 | 12/2015 |
| FR | 2504067 | 10/1982 |
| GB | 1303955 * | 1/1973 |
| JP | 4-66305 * | 2/1992 |
| WO | 2010/115860 A1 | 10/2010 |
| WO | 2010/115861 A1 | 10/2010 |
| WO | 2012/049177 A1 | 4/2012 |
| WO | 2012/049206 A1 | 4/2012 |
| WO | 2013/017421 A1 | 2/2013 |
| WO | 2013/017422 A1 | 2/2013 |
| WO | 2013/017423 A1 | 2/2013 |
| WO | 2013/019366 A2 | 2/2013 |
| WO | 2013/117476 A1 | 8/2013 |
| WO | 2013/117477 A1 | 8/2013 |
| WO | 2013/127685 A1 | 9/2013 |
| WO | 2014/123715 A1 | 8/2014 |
| WO | 2015/007641 A1 | 1/2015 |
| WO | 2015/007642 A1 | 1/2015 |
| WO | 2015/014574 A1 | 2/2015 |
| WO | 2015014575 A1 | 2/2015 |
| WO | 2015165777 A1 | 11/2015 |

* cited by examiner

RADIAL TIRE HAVING AN IMPROVED BELT STRUCTURE

1. FIELD OF THE INVENTION

The present invention relates to vehicle tyres and to the crown reinforcement or belt thereof. It relates more specifically to the multilayer composite laminates used in the belt of such tyres notably for passenger vehicles or vans.

2. PRIOR ART

A tyre with a radial carcass reinforcement for a passenger vehicle or van comprises, as is known, a tread, two inextensible beads, two flexible sidewalls connecting the beads to the tread and a rigid crown reinforcement or "belt" arranged circumferentially between the carcass reinforcement and the tread.

The tyre belt is generally made up of at least two rubber plies referred to as "working plies", "triangulation plies" or else "working reinforcement" which are superposed and crossed, usually reinforced with metal cords arranged substantially parallel to one another and inclined with respect to the median circumferential plane, it being possible for these working plies to be associated or not to be associated with other plies and/or fabrics of rubber. These working plies have the prime function of giving the tyre high "drift thrust" or "cornering" stiffness which, in the known way, is necessary for achieving good roadholding ("handling") on the motor vehicle.

The above belt, and this is particularly true of tyres liable to run at sustained high speeds, may further comprise above the working plies (on the tread side) an additional rubber ply, referred to as "hooping ply" or "hoop reinforcement", which is generally reinforced with reinforcing threads referred to as "circumferential", which means to say that these reinforcing threads are disposed practically parallel to one another and extend substantially circumferentially around the tyre casing to form an angle preferably in a range from −5° to +5° with the median circumferential plane. The primary role of these circumferential reinforcing threads is, it should be remembered, to withstand the centrifuging of the crown at high speed.

Such belt structures, which ultimately consist of a multilayer composite laminate comprising at least one hooping ply, usually textile, and two working plies, generally of metal, are well known to a person skilled in the art and do not need to be described in greater detail here. The general prior art describing such belt structures is illustrated in particular by patent documents U.S. Pat. No. 4,371,025, FR 2 504 067 or U.S. Pat. No. 4,819,705, EP 738 615, EP 795 426 or U.S. Pat. No. 5,858,137, EP 1 162 086 or US 2002/0011296, EP 1 184 203 or US 2002/0055583.

The availability of increasingly strong and durable steels means that tyre manufacturers are nowadays, as far as possible, tending towards the use in tyre belts of cords of a very simple structure, notably having just two threads, or even of individual filaments, in order on the one hand to simplify the manufacture and reduce costs, and on the other hand to reduce the thickness of the reinforcing plies and thus the hysteresis of the tyres, and ultimately to reduce the energy consumption of the vehicles fitted with such tyres.

However, efforts aimed at reducing the mass of the tyres, in particular by reducing the thickness of their belt and of the layers of rubber of which it is made do, quite naturally, come up against physical limits which may give rise to a number of difficulties. In particular, it sometimes happens that the hooping function afforded by the hoop reinforcement and the stiffening function afforded by the working reinforcement are no longer sufficiently differentiated from one another and can interfere with one another. This is detrimental to the correct operation of the crown of the tyre, and to the performance and overall endurance of the tyre.

Thus, patent applications WO 2013/117476, WO 2013/117477, WO 2015/014574 and WO 2015/014575, filed by the applicant companies, have proposed a multilayer composite laminate with a specific structure that allows the belt of the tyres to be lightened appreciably, and thus their rolling resistance to be lowered, while alleviating the abovementioned drawbacks.

These applications disclose a radial tyre, defining three main directions, circumferential, axial and radial, comprising a crown surmounted by a tread, two sidewalls, two beads, each sidewall connecting each bead to the crown, a carcass reinforcement that is anchored in each of the beads and extends in the sidewalls and into the crown, a crown reinforcement or belt that extends in the crown in the circumferential direction and is situated radially between the carcass reinforcement and the tread, the said belt comprising a multilayer composite laminate comprising at least three superposed layers of reinforcers, the said reinforcers being unidirectional within each layer and embedded in a thickness of rubber, with, notably:

- on the tread side, a first layer of rubber comprising a first row of reinforcers which are oriented at an angle alpha of −5 to +5 degrees with respect to the circumferential direction, these reinforcers, referred to as first reinforcers, being made of a heat-shrinkable textile material;
- in contact with the first layer and disposed beneath the latter, a second layer of rubber comprising a second row of reinforcers which are oriented at a given angle beta, which is positive or negative, of between 10 and 30 degrees with respect to the circumferential direction, these reinforcers, referred to as second reinforcers, being metal reinforcers;
- in contact with the second layer and disposed beneath the latter, a third layer of rubber comprising a third row of reinforcers which are oriented at an angle gamma the opposite of the angle beta, itself being between 10 and 30 degrees with respect to the circumferential direction, these reinforcers, referred to as third reinforcers, being metal reinforcers.

According to those applications, the first textile reinforcers are made up of multifilament fibres, for example made of polyamide or of polyester, these fibres being plied together in the form of textile cords or twisted individually on themselves, or else made up of monofilaments of large diameter or collections of such monofilaments. The second and third reinforcers themselves consist of steel monofilaments, particularly made of very high strength carbon steel.

The above patent applications have demonstrated that it is possible, through the specific construction of their multilayer laminate, notably through the use of textile circumferential reinforcers the heat-shrinkability of which is controlled and of metal reinforcers in the form of individual monofilaments of small diameter, to achieve an appreciable reduction in the overall thickness of the belts of tyres, and to do so without detracting from the correct operation and differentiation of the functions, on the one hand, of hooping afforded by the circumferential reinforcers of the first layer and, on the other hand, of stiffening, afforded by the metal reinforcers of the two other layers.

Thus, the weight of the tyres and the rolling resistance thereof can be reduced, at low cost thanks to the use of steel monofilaments that do not require any prior assembly operation, and this can be achieved without penalty to the cornering stiffness and therefore roadholding or the overall endurance in driving.

However, efforts aimed at reducing the mass of the tyres, particularly by reducing the thickness of their belt and of the layers of rubber of which it is made do, quite naturally, come up against physical limits which may give rise to a number of difficulties.

One difficulty is notably associated with the risk of penetration of corrosive agents such as water or oxygen of the air through the tread, for example as a result of cuts, and the carrying thereof through the first layer of textile reinforcers to the metal reinforcers of the belt, which risk is of course heightened when attempts are made to reduce the thicknesses of rubber as mentioned hereinabove. The presence of these agents, especially of this moisture, plays a significant part in carrying the risk of causing surface corrosion of the metal reinforcers, not to mention the risk of impairing the adhesion to the surrounding rubber.

3. BRIEF DESCRIPTION OF THE INVENTION

In continuing their research, the applicant companies have developed an improved multilayer composite laminate, of novel architecture, which addresses is the above-mentioned problem, and which therefore may constitute an advantageous alternative to the laminates described in the aforementioned applications.

Thus, a first subject of the present invention relates (according to the references given in the appended FIGS. 1 to 3) to a radial tyre (1), defining three main directions, circumferential (X), axial (Y) and radial (Z), comprising a crown (2) surmounted by a tread (3), two sidewalls (4), two beads (5), each sidewall (4) connecting each bead (5) to the crown (2), a carcass reinforcement (7) that is anchored in each of the beads (5) and extends in the sidewalls (4) as far as the crown (2), a crown reinforcement or belt (10) that extends in the crown (2) in the circumferential direction (X) and is situated radially between the carcass reinforcement (7) and the tread (3), the said belt (10) comprising a multilayer composite laminate comprising at least three superposed layers of reinforcers (110, 120, 130), the said reinforcers being unidirectional within each layer and embedded in a thickness of rubber (respectively C1, C2, C3), with:
  on the tread side, a first layer of rubber (C1) comprising at least one row of textile reinforcers (110) which are oriented at an angle alpha of −5 to +5 degrees with respect to the circumferential direction (X), these reinforcers (110) being made of a heat-shrinkable textile material;
  in contact with the first layer (C1) and disposed beneath the latter, a second layer of rubber (C2) comprising a first row of metal reinforcers (120) (also referred to as first metal reinforcers) which are oriented at a given angle beta, positive or negative, of between 10 and 30 degrees with respect to the circumferential direction (X);
  in contact with the second layer (C2) and disposed beneath the latter, a third layer of rubber (C3) comprising a second row of metal reinforcers (130) (also referred to as second metal reinforcers) which are oriented at an angle gamma the opposite of the angle beta, the said angle gamma itself being between 10 and 30 degrees with respect to the circumferential direction (X);
  the metal reinforcers (120, 130) being steel monofilaments of which the diameter or thickness, denoted D1 and D2, respectively, is between 0.20 mm and 0.50 mm;

this tyre being characterized in that the reinforcers (110) made of heat-shrinkable textile material are tapes with a thickness denoted "T" comprised between 0.1 and 1 mm and width denoted "W" comprised between 2 and 50 mm.

The above-mentioned risks of corrosion or loss of adhesion are appreciably reduced, in the laminate, thanks to the use of textile reinforcers (110) in the form of tapes, possibly laid in spiral turns very close to one another in the axial direction (Y) or even staggered over several layers, thus offering a "barrier" effect against water or corrosive agents which is markedly improved by comparison with the conventional multifilament fibre-based textile cords like those described in applications WO 2013/117476 and WO 2013/117477, alternatively with the large-diameter monofilaments as described in WO 2015/014574 and WO 2015/014575.

Furthermore, these tapes being able to, for the same ultimate tensile strength, have a far smaller thickness in comparison with the conventional textile reinforcers mentioned hereinabove, another appreciable and resulting advantage is that of being able to reduce still further the overall thickness of the belt and the hysteresis of the tyre.

The multilayer composite laminate according to the invention can be used as a belt reinforcing element for any type of tyre, particularly for passenger vehicles notably including 4×4s and SUVs (Sport Utility Vehicles) or for vans.

BRIEF DESCRIPTION OF THE DRAWINGS

The invention and its advantages will be readily understood in the light of the following detailed description and exemplary embodiments, and also FIGS. 1 to 3 relating to these embodiments, which schematically show (unless otherwise indicated, not to a specific scale):
  in radial section (which means a section in a plane containing the axis of rotation of the tyre), an example of a tyre (1) according to the invention, incorporating within its belt (10) a multilayer composite laminate according to the invention (FIG. 1);
  in cross section, two examples of a multilayer composite laminate (C1, C2, C3) used in the tyre (1) according to the invention, using reinforcers (110) made of heat-shrinkable textile material in the form of tapes (FIGS. 2 and 3).

4. DEFINITIONS

Figure 1:
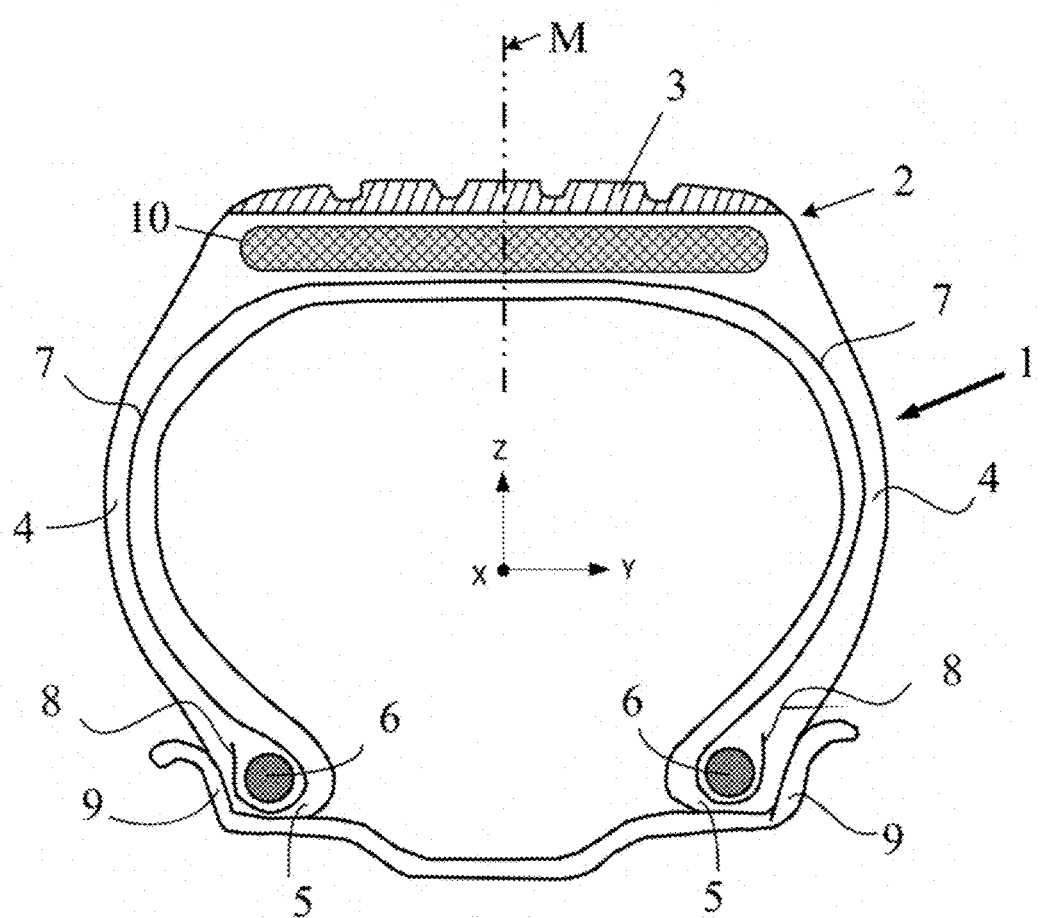

In the present application, terms are understood as follows:
  "rubber" or "elastomer" (the two terms being considered to be synonymous): any type of elastomer, be it of the diene type or the non-diene type, for example thermoplastic;
  "rubber composition" or "rubbery composition": a composition which contains at least one rubber and one filler;
  "layer": a sheet, band or any other element of which the thickness is relatively small compared to its other dimensions, preferably in which the ratio of thickness to the largest of the other dimensions is less than 0.5, more preferably less than 0.1;
  "axial direction": a direction substantially parallel to the axis of rotation of the tyre;

"circumferential direction": a direction which is substantially perpendicular both to the axial direction and to a radius of the tyre (in other words, tangential to a circle the centre of which lies on the axis of rotation of the tyre);

"radial direction": a direction along a radius of the tyre, that is to say any direction that passes through the axis of rotation of the tyre and is substantially perpendicular to this direction, that is to say making an angle of no more than 5 degrees with a perpendicular to this direction;

a "monofilament" generally means any individual filament, whatever the shape of its cross section, the diameter (in the case of a circular cross section) or thickness (in the case of a non-circular cross section) of which is greater than 100 μm. This definition equally covers monofilaments of essentially cylindrical shape (with circular cross section) and monofilaments of other shapes, for example oblong monofilaments (of flattened shape) or of rectangular or square cross section;

"oriented along an axis or in a direction": when speaking of any element such as a reinforcer, an element which is oriented substantially parallel to this axis or this direction, that is to say makes an angle of no more than 5 degrees (and thus zero or at most equal to 5 degrees) with this axis or this direction;

"oriented perpendicular to an axis or a direction": when speaking of any element such as a reinforcer, an element which is oriented substantially perpendicular to this axis or this direction, that is to say makes an angle of no more than 5 degrees with a perpendicular to this axis or this direction;

"median circumferential plane" (denoted M): the plane perpendicular to the axis Y of rotation of the tyre which is situated mid-way between the two beads and passes through the middle of the crown reinforcement or belt;

"reinforcer" or "reinforcing thread" in the most general sense: any long and slender strand, that is to say any longilinear, filiform strand with a length that is long in relation to its cross section, notably any individual filament, any multifilament fibre or any assembly of such filaments or fibres such as a plied yarn or a cord, it being possible for this strand or thread to be rectilinear or non-rectilinear, for example twisted, or crimped, such a strand or thread being able to reinforce a rubber matrix (that is to say to improve the tensile properties of the matrix);

"flat reinforcer" or "tape": a reinforcer which has the feature of being flat and therefore of taking the form of a strip, of a narrow film the length of which is very great in relation to its cross section; the aspect ratio or width-to-thickness ratio (W/T) of the cross section of which is preferably greater than 3, more preferably greater than 5, irrespective of the particular shape (rectangular or non-rectangular, for example oval or oblong, concave or convex) of this cross section, it being understood that the preferential shape of the cross section of the strip is substantially rectangular or oblong, "unidirectional reinforcers": reinforcers that are essentially mutually parallel, that is to say oriented along one and the same axis;

"laminate" or "multilayer laminate": within the meaning of the International Patent Classification, any product comprising at least two layers, of flat or non-flat form, which are in contact with one another, it being possible for the latter to be or not to be joined or connected together; the expression "joined" or "connected" should be interpreted broadly so as to include all means of joining or assembling, in particular via adhesive bonding.

Moreover, unless expressly indicated otherwise, all the percentages (%) shown are % by weight.

The expression "x and/or y" means "x" or "y" or both (i.e. "x and y"). Any range of values denoted by the expression "between a and b" represents the field of values ranging from more than "a" to less than "b" (that is to say limits "a" and "b" excluded), whereas any range of values denoted by the expression "from a to b" means the field of values ranging from "a" up to "b" (that is to say including the strict limits "a" and "b").

5. DETAILED DESCRIPTION AND EXEMPLARY EMBODIMENTS OF THE INVENTION

By way of example, FIG. 1 very schematically shows (that is to say without being drawn to any particular scale) a radial section through a tyre according to the invention, for example for a vehicle of the passenger vehicle or van type, the belt of which comprises a multilayer composite laminate according to the invention.

This tyre (1) according to the invention, defining three perpendicular directions, circumferential (X), axial (Y) and radial (Z), comprises a crown (2) surmounted by a tread (3), two sidewalls (4), two beads (5), each sidewall (4) connecting each bead (5) to the crown (2), a carcass reinforcement (7) that is anchored in each of the beads (5) and extends in the sidewalls (4) as far as the crown (2), a crown reinforcement or belt (10) that extends in the crown (2) in the circumferential direction (X) and is situated radially between the carcass reinforcement (7) and the tread (3). The carcass reinforcement (7) is, in the known way, made up of at least one rubber ply reinforced with textile cords referred to as "radial", which are disposed practically parallel to one another and extend from one bead to the other so as to make an angle generally between 80° and 90° with the median circumferential plane M; in this case, by way of example, it is wrapped around two bead wires (6) in each bead (5), the turn-up (8) of this reinforcement (7) being, for example, disposed towards the outside of the tyre (1) which is shown in this case as mounted on its rim (9).

According to the present invention, and in accordance with the depictions in FIGS. 2 and 3 which will be described in detail later on, the belt (10) of the tyre (1) comprises a multilayer composite laminate comprising at least three superposed (in the direction Z) layers of reinforcers (110, 120, 130), the said reinforcers being unidirectional within each layer and embedded in a thickness of rubber (C1, C2, C3, respectively), with:

on the tread side, a first layer of rubber (C1) comprising at least one row (extending in the direction Y) of textile reinforcers (110) which are oriented at an angle alpha (a) of −5 to +5 degrees with respect to the circumferential direction (X), these reinforcers (110) being made of a heat-shrinkable textile material;

in contact with the first layer (C1) and disposed beneath the latter, a second layer of rubber (C2) comprising a first row (extending in the direction Y) of metal reinforcers (120) which are oriented at a given angle beta (13), positive or negative, of between 10 and 30 degrees with respect to the circumferential direction (X);

in contact with the second layer (C2) and disposed beneath the latter, a third layer of rubber (C3) comprising a second row (extending in the direction Y) of metal reinforcers (130) which are oriented at an angle gamma (γ) the opposite of the angle beta (β), itself being between 10 and 30 degrees with respect to the circumferential direction (X);

the metal reinforcers (120, 130) being steel monofilaments of which the diameter or thickness, denoted D1 and D2, respectively, is between 0.20 mm and 0.50 mm.

According to the invention, the angles β and γ, of opposite direction, which are both between 10° and 30°, may be identical or different, that is to say that the metal reinforcers of the second (120) and third (130) rows may be disposed symmetrically or non-symmetrically on each side of the median circumferential plane (M) defined above.

In this tyre shown schematically in FIG. 1, it will of course be understood that the tread (3), the multilayer laminate (10) and the carcass reinforcement (7) may or may not be in contact with one another, even though these parts have been deliberately separated in FIG. 1, schematically, for the sake of simplicity and to make the drawing clearer. They could be physically separated, at the very least for a portion of them, for example by tie gums, well known to a person skilled in the art, that are intended to optimize the cohesion of the assembly after curing or crosslinking.

According to one essential feature of the invention, the reinforcers (110) are tapes with a thickness "T" comprised between 0.1 and 1 mm and width denoted "W" comprised between 2 and 50 mm.

Tapes made of heat-shrinkable textile material as described in the present application, or wider films from which these tapes can be obtained by a simple cutting operation, are well known to those skilled in the art and commercially available; they have been described, for example, in documents WO 2010/115860, WO 2010/115861, WO2012/049177, WO2012/049206, WO 2013/019366, WO 2013/127685, WO 2014/123715.

The thickness T (measured in the radial direction Z in FIGS. 2 and 3) is preferably comprised in a range from 0.15 mm to 0.8 mm, more preferably from 0.2 to 0.6 mm. The width W (measured in the axial direction Y in FIGS. 2 and 3) is preferably comprised in a range from 3 mm to 30 mm, more preferably from 5 to 20 mm.

Any heat-shrinkable textile material is suitable, and in particular and preferably a textile material that satisfies the contraction features CT mentioned hereinafter is suitable.

For preference, this heat-shrinkable textile material is selected from the group consisting of polyamides, polyesters and polyketones. Among the polyamides, mention may be made notably of the polyamides PA-4,6, PA-6, PA-6,6, PA-11 or PA-12. Mention may be made, among the polyesters, for example, of PET (polyethylene terephthalate), PEN (polyethylene naphthalate), PBT (polybutylene terephthalate), PBN (polybutylene naphthalate), PPT (polypropylene terephthalate), and PPN (polypropylene naphthalate). More preferably, use is made of a polyamide (nylon) or a polyester.

The density $d_0$ of the tapes (110) in the first layer of rubber (C1), measured in the axial direction (Y), is preferably comprised between 3 and 50 tapes/dm, more preferably between 5 and 20 tapes/dm.

Figure 3:
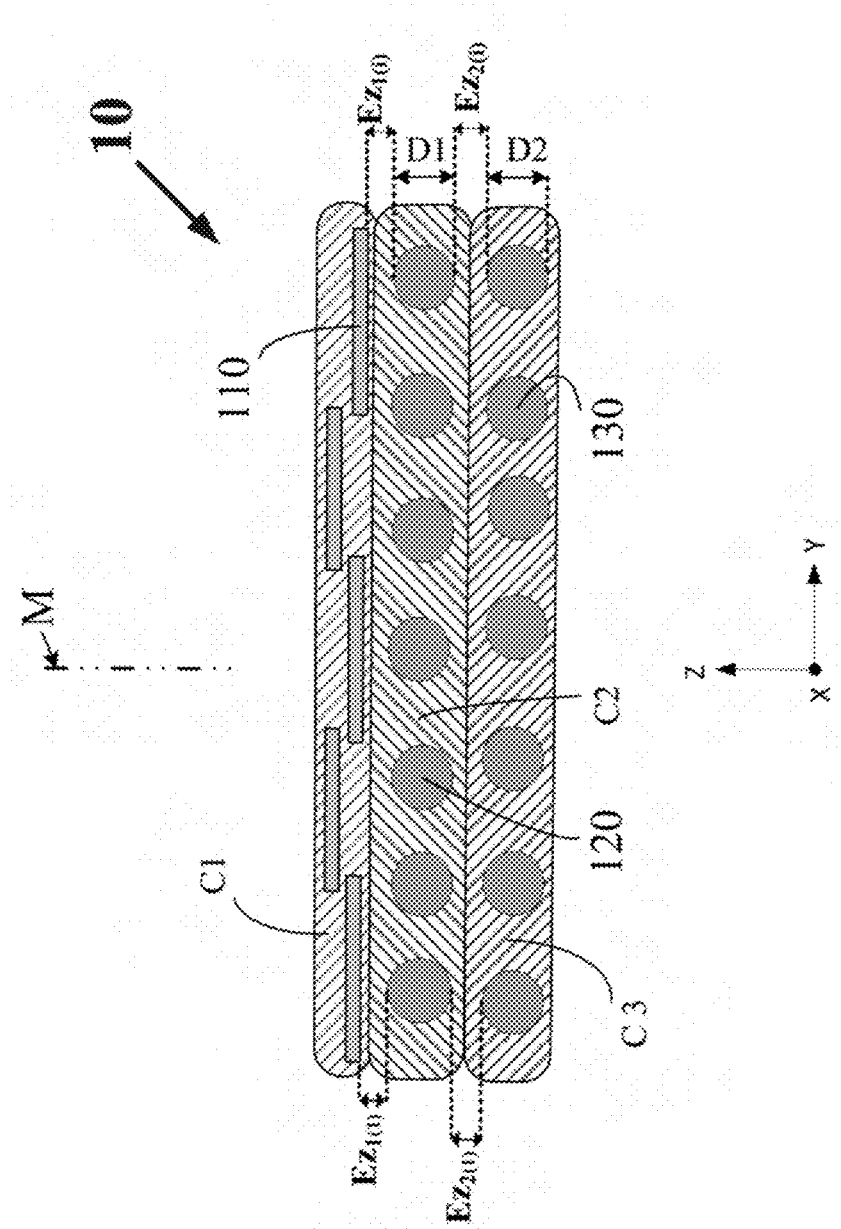

The invention applies to instances in which more than one row (for example two rows) of textile tape (110) is used in the first layer of rubber (C1), as illustrated notably in FIG. 3.

Figure 2:
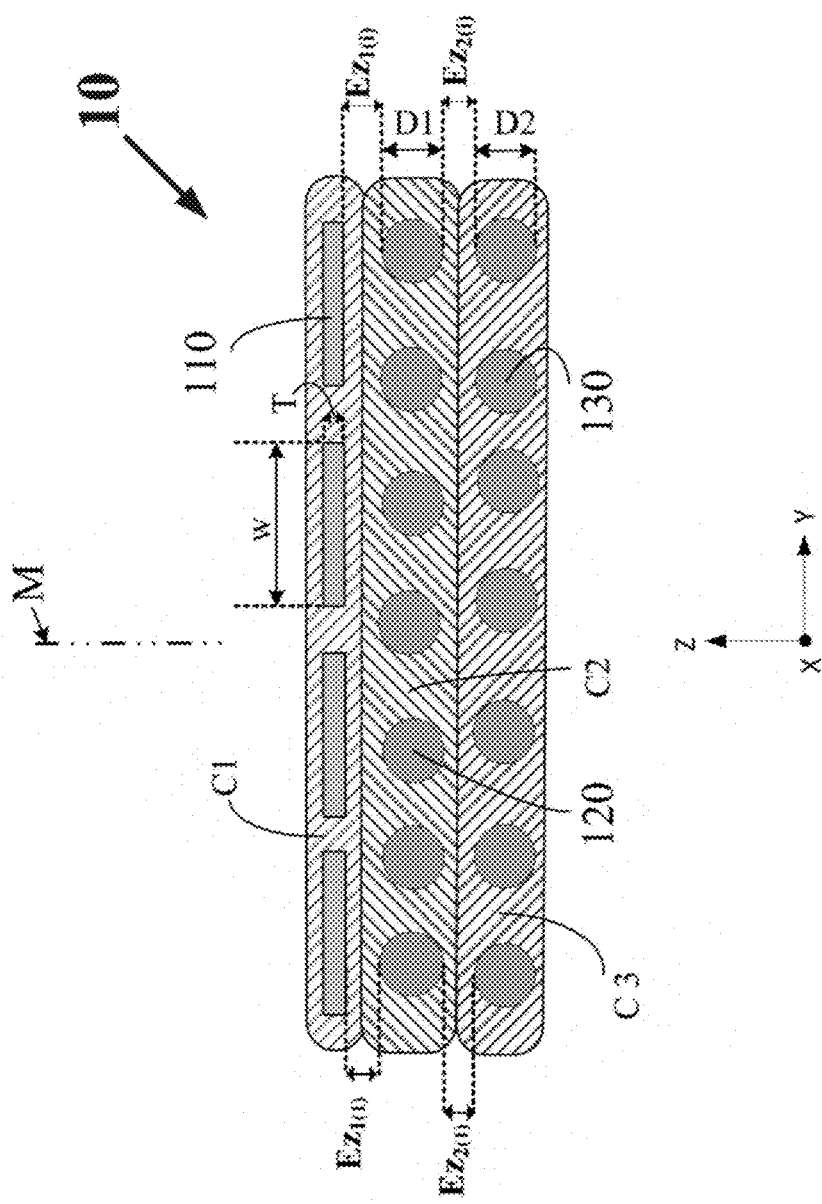

The invention also applies to instances in which the textile tapes, in any given row, or the turns in the event that the one same tape is wound in a helix in a radial direction (Z) over several turns, are not axially contiguous (in the direction Y) as illustrated by way of example in FIGS. 2 and 3, or alternatively are contiguous axially (in the direction Y) or even, and this may constitute another advantageous form of embodiment of the invention, partially axially superposed (in the direction Y).

Their thermal contraction (denoted CT), after 2 min at 185° C., is preferably less than 7.5%, more preferably less than 7.0%, particularly less than 6.0%, which values have proven to be preferable for the manufacturing and dimensional stability of the tyre casings, particularly during the phases of curing and cooling thereof.

This relates to the relative contraction of these tapes (110) under the test conditions mentioned below. The parameter CT is measured, unless specified otherwise, in accordance with the standard ASTM D1204-08, for example on an apparatus of the "Testrite" type under what is known as a standard pretension of 0.5 cN/tex (which is therefore expressed with respect to the titer or linear density of the test specimen being tested). At constant length, the maximum force of contraction (denoted $F_c$) is also measured using the above test, this time at a temperature of 180° C. and under 3% elongation. This force of contraction $F_c$ is preferably greater than 20 N (Newtons). A high force of contraction has proven to be particularly beneficial to the hooping capability of the tapes (110) made of heat-shrinkable textile material with respect to the crown reinforcement of the tyre when the latter heats up under high running speeds.

The above parameters CT and $F_c$ can be measured without distinction on the adhesive-coated initial textile reinforcers before they are incorporated into the laminate and then into the tyre, or alternatively can be measured on these reinforcers once they have been extracted from the central zone of the vulcanized tyre and preferably "derubberized" (that is to say rid of the rubber which coats them in the layer C1).

The heat-shrinkable textile tapes described hereinabove offer the advantage, as compared with the conventional textile cords or monofilaments described in the introduction of this document, of better protecting the rest of the multilayer composite laminate against moisture, and thus of limiting the risks of compromising the adhesion between the various reinforcers of the laminate and their surrounding rubber matrix, not to mention the risks of corrosion of the surface of monofilaments made of steel.

The metal reinforcers (120, 130) consist of steel monofilaments which, it will be remembered, are not plied, cabled together but used individually; their diameter (or, by definition, thickness if the monofilament has a right cross section which is non-circular), denoted D1 and D2 respectively, is comprised between 0.20 mm and 0.50 mm. D1 and D2 may be identical or different from one layer to the other; if they are different, D2 may be greater than D1 or indeed less than D1, depending on the particular embodiments of the invention.

More preferably, for optimum endurance of the tyre of the invention, notably under harsh running conditions, it is preferable for D1 and D2 to be greater than 0.25 mm and less than 0.40 mm, more preferably comprised in a range from 0.28 to 0.35 mm.

The respective density, denoted $d_1$ and $d_2$, of these reinforcers (120, 130) in the second (C2) and third (C3) layers of rubber respectively, measured in the axial direction (Y), is preferably comprised between 100 and 180 threads/dm, more preferably between 110 and 170 threads/dm, particularly between 120 and 160 threads/dm.

Preferably, the steel of the monofilaments is a carbon steel such as the steels used in cords of the "steel cords" type for tyres; however it is of course possible to use other steels, for example stainless steels, or other alloys.

According to one preferred embodiment, when a carbon steel is used, its carbon content (% by weight of steel) is in a range from 0.5% to 1.2%, more preferably from 0.7% to 1.0%. The invention applies in particular to steels of the "Normal Tensile" (NT) or "High Tensile" (HT) steel cord type, the (second and third) reinforcers made of carbon steel then having a tensile strength (Rm) preferably higher than 2000 MPa, more preferably higher than 2500 MPa. The invention also applies to super high tensile (SHT), ultra high tensile (UHT) or megatensile (MT) steels of the steel cord type, the (second and third) reinforcers made of carbon steel then having a tensile strength (Rm) which is preferably higher than 3000 MPa, more preferably higher than 3500 MPa. The total elongation at break (At) of these reinforcers, which is the sum of the elastic elongation and the plastic elongation, is preferably greater than 2.0%.

As far as the steel reinforcers are concerned, the measurements of force at break, strength at break denoted Rm (in MPa) and elongation at break denoted At (total elongation in %) are taken under tension in accordance with ISO standard 6892 of 1984.

The steel used, whether it is in particular a carbon steel or a stainless steel, may itself be coated with a layer of metal which improves for example the workability of the steel monofilament or the wear properties of the reinforcer and/or of the tyre themselves, such as properties of adhesion, corrosion resistance or even resistance to ageing. According to one preferred embodiment, the steel used is covered with a layer of brass (Zn—Cu alloy) or of zinc; it will be recalled that, during the process of manufacturing the wire threads, the brass or zinc coating makes the wire thread easier to draw, and makes the wire thread adhere to the rubber better. However, the reinforcers could be covered with a thin layer of metal other than brass or zinc, having for example the function of improving the corrosion resistance of these threads and/or their adhesion to the rubber, for example a thin layer of Co, Ni, Al, of an alloy of two or more of the Cu, Zn, Al, Ni, Co, Sn compounds.

Each layer (C1, C2, C3) of rubber composition (or, hereinbelow "layer of rubber") of which the multilayer composite laminate is made is based on at least one elastomer and one filler.

The invention of course applies to instances in which these (at least) three layers of rubber are discernible from one another in a cross section (in the Y, Z plane) of the laminate, as illustrated by way of example in FIGS. 2 and 3, for example because of a different formulation, or indeed not discernible from one another in cross section, for example because they have the same formulation from one layer to another.

Preferably, the rubber is a diene rubber, that is to say, as will be recalled, any elastomer (single elastomer or blend of elastomers) which is derived at least in part (i.e. a homopolymer or copolymer) from diene monomers, that is to say monomers which bear two carbon-carbon double bonds, whether these are conjugated or not.

This diene elastomer is more preferably selected from the group consisting of polybutadienes (BR), natural rubber (NR), synthetic polyisoprenes (IR), butadiene copolymers, isoprene copolymers and blends of these elastomers, such copolymers being notably selected from the group consisting of butadiene-styrene copolymers (SBR), isoprene-butadiene copolymers (BIR), isoprene-styrene copolymers (SIR) and isoprene-butadiene-styrene copolymers (SBIR).

One particularly preferred embodiment consists in using an "isoprene" elastomer, that is to say an isoprene homopolymer or copolymer, in other words a diene elastomer selected from the group consisting of natural rubber (NR), synthetic polyisoprenes (IRs), various isoprene copolymers and mixtures of these elastomers.

The isoprene elastomer is preferably natural rubber or a synthetic polyisoprene of the cis-1,4 type. Use is preferably made, among these synthetic polyisoprenes, of polyisoprenes having a content (mol %) of cis-1,4 bonds of greater than 90%, more preferably still of greater than 98%. According to one preferred embodiment, each layer of rubber composition contains 50 to 100 phr of natural rubber. According to other preferred embodiments, the diene elastomer may consist, in full or in part, of another diene elastomer such as, for example, an SBR elastomer used as a blend with another elastomer, for example of the BR type, or used alone.

Each rubber composition may comprise just one or several diene elastomer(s) as well as all or some of the additives customarily used in the rubber matrices intended for the manufacture of tyres, such as for example reinforcing fillers such as carbon black or silica, coupling agents, anti-ageing agents, antioxidants, plasticizing agents or extender oils, whether the latter are of aromatic or non-aromatic nature (notably very weakly aromatic or non-aromatic oils, for example of the naphthene or paraffin type, with high or preferably low viscosity, MES or TDAE oils), plasticizing resins with a high glass transition temperature (above 30° C.), agents that aid with processing (processability of) the compositions in the raw state, tackifying resins, antireversion agents, methylene acceptors and donors such as, for example, HMT (hexamethylenetetramine) or H3M (hexamethoxymethylmelamine), reinforcing resins (such as resorcinol or bismaleimide), known adhesion promoting systems of the metal salts type for example, notably salts of cobalt, of nickel or of lanthanide, a cross-linking or vulcanization system.

Preferably, the system for crosslinking the rubber composition is a system referred to as a vulcanization system, that is to say one based on sulfur (or on a sulfur donor agent) and a primary vulcanization accelerator. Various known secondary vulcanization accelerators or vulcanization activators may be added to this basic vulcanization system. Sulfur is used at a preferred content of between 0.5 and 10 phr, and the primary vulcanization accelerator, for example a sulfenamide, is used at a preferred content of between 0.5 and 10 phr. The content of reinforcing filler, for example of carbon black and/or silica, is preferably higher than 30 phr, notably between 30 and 100 phr.

All carbon blacks, especially blacks of the HAF, ISAF or SAF type, conventionally used in tyres ("tyre-grade" blacks) are suitable as carbon blacks. Mention will more particularly be made, among the latter, of the carbon blacks of 300, 600 or 700 (ASTM) grade (for example, N326, N330, N347, N375, N683 or N772). Precipitated or fumed silicas having a BET surface area of less than 450 m$^2$/g, preferably from 30 to 400 m$^2$/g, are notably suitable as silicas.

A person skilled in the art will know, in light of the present description, how to adjust the formulation of the rubber compositions in order to achieve the desired levels of properties (especially modulus of elasticity), and to adapt the formulation to suit the specific application envisaged.

Preferably, each rubber composition has, in the crosslinked state, a secant modulus in extension, at 10% elongation, of between 4 and 25 MPa, more preferably between 4 and 20 MPa; values notably between 5 and 15 MPa have proven to be particularly suitable. Modulus measurements are made under tension, unless otherwise indicated in accordance with the standard ASTM D 412 of 1998 (test specimen "C"): the "true" secant modulus (that is to say the one with respect to the actual cross section of the test specimen) is measured in second elongation (that is to say after an accommodation cycle) at 10% elongation, denoted here by Ms and expressed in MPa (under standard temperature and relative humidity conditions in accordance with standard ASTM D 1349 of 1999).

In order to cause the various reinforcers (110, 120, 130) to adhere to their aforementioned (at least) three respective layers of rubber (C1, C2, C3), it is possible to use any suitable adhesive system, for example, as far as the steel reinforcers are concerned, an adhesive coating such as brass or zinc (although it is also possible to use a plain, that is to say uncoated steel), or, for example, as far as the textile tapes are concerned, a textile adhesive of the "RFL" (resorcinol-formaldehyde-latex) type or any equivalent adhesive known to provide satisfactory adhesion between rubber and polymers such as polyester or polyamide, such as, for example, the adhesive compositions described in patent applications WO 2013/017421, WO 2013/017422, WO 2013/017423, WO 2015/007641, WO 2015/007642; prior to the application of an RFL type adhesive as above, it may be advantageous to activate the surface of the tape, for example using a physical and/or chemical approach, in order to improve its acceptance of the adhesive and/or its final adhesion to the rubber; a physical treatment may for example consist in a radiation treatment using for example a beam of electrons, or a plasma; a chemical treatment may for example consist in a prior passage through a bath of epoxy resin and/or of isocyanate compound.

At least one (and more preferably all) of the following preferred features, measured in the central part of the belt of the tyre in the vulcanized state, on each side of the median plane (M) over a total axial width of 10 cm, are satisfied:
- the mean thickness $Ez_1$ of rubber separating a textile reinforcer (110) from the metal reinforcer (120) closest to it, measured in the radial direction (Z), is less than or equal to 0.6 mm, more preferably comprised between 0.15 and 0.5 mm;
- the mean thickness $Ez_2$ of rubber separating a first metal reinforcer (120) from the two metal reinforcer (130) closest to it, measured in the radial direction (Z), is less than or equal to 0.6 mm, more preferably comprised between 0.2 and 0.55 mm.

All the data (T, W, D1, D2, $d_0$, $d_1$, $d_2$, $Ez_1$ and $Ez_2$) indicated above are mean values measured experimentally by an operator on photographs of radial sections of vulcanized tyres taken through the central part of the belt, 5 cm on each side of the median plane (M), namely over a total width of 10 cm (namely between −5 cm and +5 cm with respect to the median plane M).

FIGS. 2 and 3 schematically show (without being drawn to any particular scale), in cross section, two examples of a multilayer composite laminate used as a belt (10) in the tyre (1) according to the invention in FIG. 1, the laminate (10) incorporating tapes (110) made of heat-shrinkable textile material in the form of a single elementary row of tapes (FIG. 2) or of two radially superposed (in the direction Z) distinct rows with tapes arranged in a staggered configuration from one row to the next (FIG. 3), respectively.

As illustrated in FIG. 2, $Ez_1$ is the mean of the thicknesses ($Ez_{1(1)}$, $Ez_{1(2)}$, $Ez_{1(3)}$, . . . , $Ez_{1(i)}$) of rubber separating a (first) textile tape (110) from the (first) metal reinforcer (120) closest to it, these thicknesses each being measured in the radial direction Z and averaged over a total axial distance comprised between −5.0 cm and +5.0 cm with respect to the centre of the belt (namely, for example, to a total of around 100 measurements if there are ten reinforcers (110) per cm in the layer C1).

Expressed differently, $Ez_1$ is the mean of the minimum distances $Ez_{1(i)}$ separating each (first) textile tape (110) "back-to-back" from the first metal reinforcer (120) closest to it in the radial direction Z, this mean being calculated over all the first reinforcers (110) present in the central part of the belt, in an axial interval extending between −5 cm and +5 cm with respect to the median plane M.

Similarly, $Ez_2$ is the mean of the thicknesses of rubber ($Ez_{2(1)}$, $Ez_{2(2)}$, $Ez_{2(3)}$, . . . , $Ez_{2(i)}$) separating a first metal reinforcer (120) from the second metal reinforcer (130) closest to it, measured in the radial direction Z, this mean being calculated over a total axial distance between −5.0 cm and +5.0 cm with respect to the centre of the belt. Expressed another way, these thicknesses represent the minimum distances which separate the first metal reinforcer (120) "back-to-back" from the second metal reinforcer (130) closest to it in the radial direction Z.

Expressed differently, $Ez_2$ is the mean of the minimum distances $Ez_{2(i)}$ separating each first metal reinforcer (120) "back-to-back" from the second metal reinforcer (130) closest to it in the radial direction Z, this mean being calculated over all the first metal reinforcers (120) present in the central part of the belt, in an axial interval extending between −5 cm and +5 cm with respect to the median plane M.

For an optimized performance in terms of rolling resistance, drift thrust and running endurance, the tyre of the invention preferably satisfies at least one of the following inequalities (and more preferably all three):

$$0.15 < Ez_1/(Ez_1+T+D1) < 0.50$$

$$0.20 < Ez_2/(Ez_2+D1+D2) < 0.50$$

$$0.25 < (Ez_1+Ez_2)/(Ez_1+Ez_2+T+D1+D2) < 0.60.$$

More preferably still, the tyre of the invention preferably satisfies at least one of the following inequalities (and more preferably all three):

$$0.20 < Ez_1/(Ez_1+T+D1) < 0.45$$

$$0.25 < Ez_2/(Ez_2+D1+D2) < 0.45$$

$$0.30 < (Ez_1+Ez_2)/(Ez_1+Ez_2+T+D1+D2) < 0.55.$$

In short, thanks to the use, within the first layer of rubber (C1), of heat-shrinkable textile reinforcers in the form of tapes, the risks of corrosion or loss of adhesion of the metal monofilaments are appreciably reduced. Because these tapes can, for the same ultimate tensile strength, have a far smaller thickness in comparison with the conventional textile reinforcers as described in the introduction of this document, another appreciable and resulting advantage is that of being able to reduce still further the overall thickness of the belt and the hysteresis of the tyres.

The invention claimed is:

1. A radial tire, defining three main directions, circumferential X, axial Y and radial Z, comprising a crown surmounted by a tread, two sidewalls, two beads, each sidewall connecting each bead to the crown, a carcass reinforcement that is anchored in each of the beads and extends in the sidewalls as far as the crown, and a crown reinforcement that extends in the crown in the circumferential direction X and is situated radially between the carcass reinforcement and the tread, the crown reinforcement comprising a multilayer composite laminate comprising at least three superposed layers of reinforcers, the reinforcers being unidirectional within each layer and embedded in a thickness of rubber, comprising:
   on the tread side, a first layer of rubber comprising at least one row of textile reinforcers which are oriented at an angle alpha of −5 to +5 degrees with respect to the circumferential direction X, the textile reinforcers being made of a heat-shrinkable textile material having a force of contraction greater than 20 N measured at 180° C. at 3% elongation;
   in contact with the first layer of rubber and disposed beneath the first layer of rubber, a second layer of rubber comprising a first row of metal reinforcers which are oriented at a given angle beta of between 10 and 30 degrees with respect to the circumferential direction X, the angle beta being positive or negative;
   in contact with the second layer of rubber and disposed beneath the second layer of rubber, a third layer of rubber comprising a second row of metal reinforcers which are oriented at an angle gamma, which is the opposite of the angle beta, the angle gamma being between 10 and 30 degrees with respect to the circumferential direction X,
   wherein the metal reinforcers of the first row of metal reinforcers are steel monofilaments having a diameter D1 between 0.20 mm and 0.50 mm and the metal reinforcers of the second row of metal reinforcers are steel monofilaments having a diameter D2 between 0.20 mm and 0.50 mm
   wherein the textile reinforcers are tapes with a thickness T between 0.2 and 0.6 mm and a width W between 5 and 20 mm, and
   wherein the following inequalities are satisfied:

$$0.15 < E_{z1}/(E_{z1}+T+D1) < 0.50,$$
   $$0.20 < E_{z2}/(E_{z2}+D1+D2) < 0.50,$$
   $$0.25 < (E_{z1}+E_{z2})/(E_{z1}+E_{z2}+T+D1+D2) < 0.60,$$

$E_{z1}$ being a mean thickness between 0.15 mm and 0.5 mm of rubber separating a textile reinforcer from a metal reinforcer closest to it, measured in the radial direction Z, and
   $E_{z2}$ being a mean thickness between 0.2 mm and 0.55 mm of rubber separating a metal reinforcer of the first row of metal reinforcers from a metal reinforcer of the second row of metal reinforcers closest to it, measured in the radial direction Z.

2. The tire according to claim 1, wherein a density d1 of the textile reinforcers, measured in the axial direction Y, is between 3 and 50 tapes/dm.

3. The tire according to claim 2, wherein the density d1 is between 5 and 20 tapes/dm.

4. The tire according to claim 1, wherein D1 and D2 are each greater than 0.25 mm and less than 0.40 mm.

5. The tire according to claim 4, wherein D1 and D2 are each within a range from 0.28 to 0.35 mm.

6. The tire according to claim 1, wherein a density d2 of the metal reinforcers of the first row of metal reinforcers and a density d3 of the metal reinforcers of the second row of metal reinforcers, measured in the axial direction Y, is each between 100 and 180 threads/dm.

7. The tire according to claim 6, wherein the densities d2 and d3 are each between 110 and 170.

8. The tire according to claim 7, wherein the densities d2 and d3 are each between 120 and 160 threads/dm.

9. The tire according to claim 1, wherein a thermal contraction CT of the textile reinforcers, after 2 min at 185° C., is less than 7.5%.

10. The tire according to claim 9, wherein the CT is less than 7.0%.

11. The tire according to claim 10, wherein the CT is less than 6.0%.

12. The tire according to claim 1, wherein the steel is a carbon steel.

13. The tire according to claim 1, wherein the heat-shrinkable textile material is a polyamide or a polyester.

* * * * *